(12) United States Patent
Liu et al.

(10) Patent No.: US 8,216,323 B2
(45) Date of Patent: Jul. 10, 2012

(54) SYSTEM AND METHOD FOR HYDROGEN PRODUCTION

(75) Inventors: Ke Liu, Rancho Santa Margarita, CA (US); Parag Prakash Kulkarni, Tustin, CA (US); Gregg Anthony Deluga, Playa Del Rey, CA (US)

(73) Assignee: General Electric Company

( * ) Notice: Subject to any disclaimer, the term of this patent is extended or adjusted under 35 U.S.C. 154(b) by 2061 days.

(21) Appl. No.: 11/172,262

(22) Filed: Jun. 30, 2005

(65) Prior Publication Data
US 2007/0000176 A1    Jan. 4, 2007

(51) Int. Cl.
B01J 8/00    (2006.01)
(52) U.S. Cl. ...................................... 48/127.9
(58) Field of Classification Search ................. 48/127.1, 48/127.9, 198.1
See application file for complete search history.

(56) References Cited

U.S. PATENT DOCUMENTS

| | | |
|---|---|---|
| 6,293,979 B1 | 9/2001 | Chowdhary et al. |
| 6,680,044 B1 | 1/2004 | Tonkovich et al. |
| 2002/0000539 A1 | 1/2002 | Gaffney et al. |
| 2002/0002794 A1 | 1/2002 | Figueroa et al. |
| 2002/0012618 A1* | 1/2002 | Bromberg et al. ............ 422/190 |
| 2002/0012624 A1 | 1/2002 | Figueroa et al. |
| 2002/0013225 A1 | 1/2002 | Figueroa et al. |
| 2002/0068205 A1* | 6/2002 | Griesmeier .................... 429/19 |
| 2002/0115730 A1 | 8/2002 | Allison et al. |
| 2003/0007904 A1 | 1/2003 | Tonkovich et al. |
| 2003/0021748 A1 | 1/2003 | Hwang et al. |
| 2003/0045423 A1 | 3/2003 | Dindi et al. |
| 2004/0058230 A1 | 3/2004 | Hsu |
| 2004/0156778 A1 | 8/2004 | Hwang et al. |
| 2006/0137246 A1* | 6/2006 | Kumar et al. ..................... 48/61 |
| 2006/0199051 A1* | 9/2006 | Bai et al. ......................... 429/17 |

FOREIGN PATENT DOCUMENTS

| | | |
|---|---|---|
| EP | 0360505 B1 | 2/1994 |
| EP | 010462 | 6/2000 |
| EP | 1213779 | 6/2002 |
| GB | 0929659 | 6/1963 |
| WO | WO2004/028685 | 4/2004 |
| WO | 2004046026 | 6/2004 |
| WO | 2004083114 | 9/2004 |

OTHER PUBLICATIONS

PCT Search Report, US2006/023795, Jun. 30, 2005.

* cited by examiner

Primary Examiner — Imran Akram
(74) Attorney, Agent, or Firm — Francis T. Coppa (57) ABSTRACT

A system comprises a mixed reforming zone configured to receive a first fuel steam mixture and an oxidant to produce a first reformate stream comprising hydrogen. The system further comprises at least one steam-reforming zone configured to receive the first reformate stream, a first portion of steam and a second fuel to produce a second reformate stream comprising hydrogen. The first reformate stream is mixed with the first portion of steam and second fuel before entering the steam reforming zone.

21 Claims, 5 Drawing Sheets

SYSTEM AND METHOD FOR HYDROGEN PRODUCTION

BACKGROUND OF THE INVENTION

This invention relates to production of hydrogen from different hydrocarbon fuels such as natural gas, gasoline, diesel, and alcohols such as methanol and ethanol.

Currently, the most cost effective method of producing hydrogen is centralized steam reforming of fuels such as natural gas. Rising energy prices and concern for the environment are prompting increased attention to hydrogen as an energy source. Hydrogen has been proposed as a clean fuel for the future with many applications including vehicles and stationary power (electric utility).

The largest volumes of merchant hydrogen are consumed in ammonia plants, in refineries and in methanol production. Only a fraction of hydrogen is currently used for energy purposes. However, hydrogen's share in the energy market is increasing with the implementation of fuel cells and the growing demand for low emission or zero-emission fuels.

Steam methane reforming (SMR), autothermal reforming (ATR) and catalytic partial oxidation (CPO) have been studied for distributed hydrogen production from natural gas (NG) for fuel cells applications. SMR utilizes reforming catalysts such as Ni to convert NG and steam to a synthesis gas (syngas). Conventional ATR typically includes a catalyst to facilitate both SMR and CPO reactions. These catalysts are typically not optimized for both the different type of reactions and therefore do not reach the maximum efficiency. Conventional SMR systems are not compact since large heat exchange surface areas are required to provide heat to the endothermic steam methane reforming reaction.

CPO (without an SMR catalyst) is a compact system. However, CPO generates a syngas with relatively low hydrogen ($H_2$) to carbon monoxide (CO) ratio (~2) and hence is better suited for Fischer-Tropsch or methanol synthesis than pure $H_2$ production.

Therefore there is a need for a compact system for hydrogen production that is cost effective with efficient heat integration.

BRIEF DESCRIPTION OF THE INVENTION

In one aspect, a system comprises a mixed reforming zone configured to receive a first fuel steam mixture and an oxidant to produce a first reformate stream comprising hydrogen. The system further comprises at least one steam-reforming zone configured to receive the first reformate stream, a first portion of steam and a second fuel to produce a second reformate stream comprising hydrogen. The first reformate stream is mixed with the first portion of steam and second fuel before entering the steam reforming zone.

In another aspect, a method for producing a gas stream comprising hydrogen comprises partially oxidizing a first fuel and an oxidant in a catalytic partial oxidation zone or in an ATR zone to produce a first reformate stream comprising hydrogen. The method further comprises mixing the first reformate stream with a second fuel and steam to produce a mixed stream and steam reforming the mixed stream in a steam-reformer to produce a second reformate stream comprising hydrogen.

In yet another aspect, a system comprises a mixed reforming zone configured to receive a first fuel with steam and an oxidant to produce a first reformate stream and a pre-reformer configured to receive a first portion of steam and a second fuel to produce a pre-reformed stream comprising hydrogen. The system further comprises a first reforming zone configured to receive the pre-reformed steam and generate an exit reformed stream comprising hydrogen and a second reforming zone configured to receive the first reformate stream and exit reformate stream to generate a second reformate stream comprising hydrogen. The first reformate stream is mixed with the exit reformate stream before entering the second steam reforming zone.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
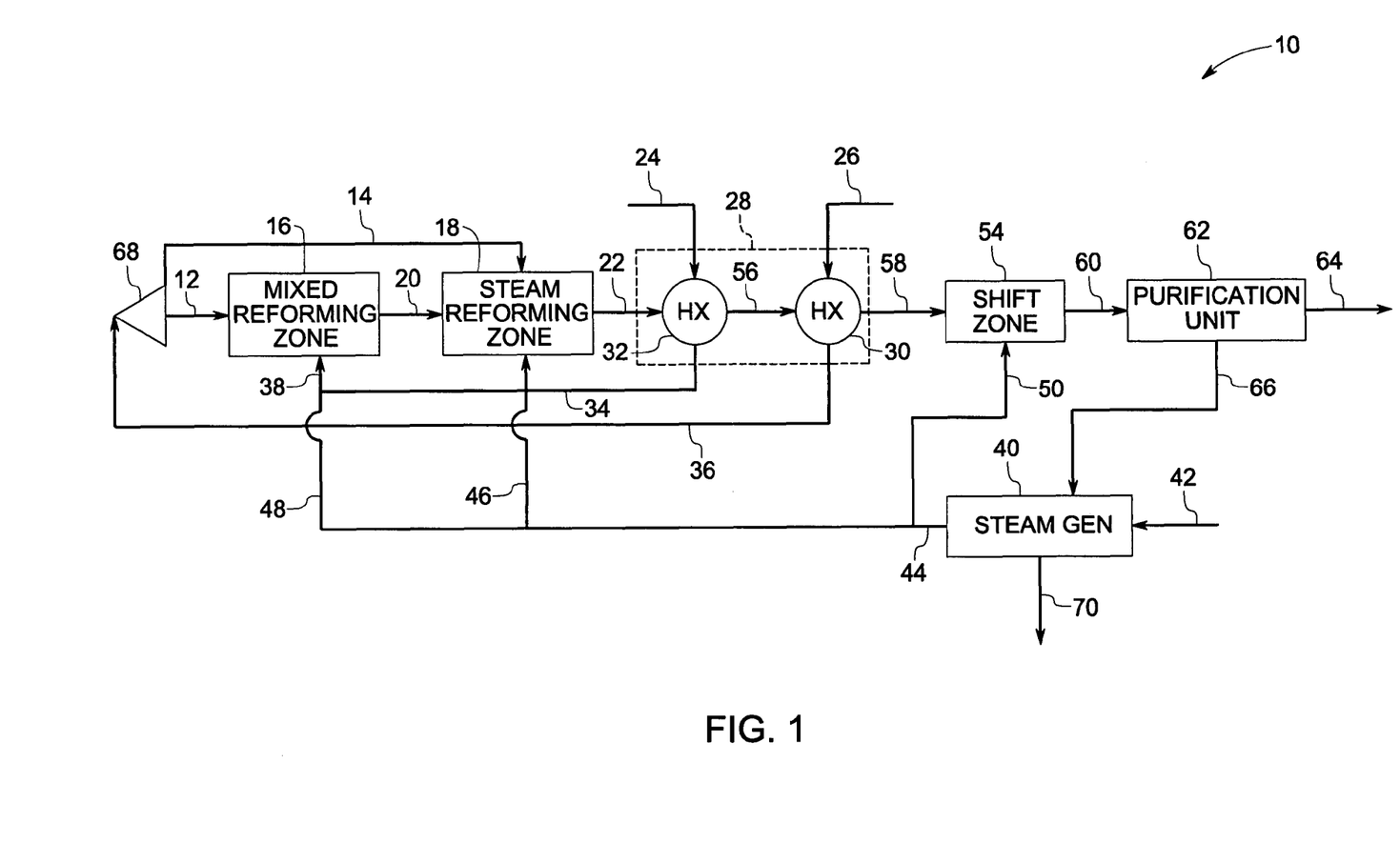
FIG. 1 illustrates an exemplary system for hydrogen production.

FIG. 1 represents an exemplary system 10 for producing hydrogen comprising a mixed reforming zone 16 and at least one steam-reforming zone 18. The mixed reforming zone 16 is configured to receive a first fuel 12 and an oxidant 34 to produce a first reformate stream 20. The steam reforming zone 18 is configured to receive the first reformate stream 20, a first portion of steam 46 and a second fuel 14 to produce a second reformate stream 22 enriched with hydrogen. In one embodiment, the first reformate stream 20 and the steam 46 are mixed to form a mixed stream, which mixed stream is introduced into the steam reforming zone 18. The mixed reforming zone 16 comprises a catalyst for promoting catalytic partial oxidation reaction. In one embodiment, the mixed reforming zone 16 promotes both catalytic partial oxidation (CPO) and steam reforming reactions. The mixed reforming zone 16 is configured to receive a second portion of steam 48 to produce the first reformate gas stream 20 comprising hydrogen. In one embodiment, the second portion of steam 48 is mixed with the oxidant 34 to form a mixed stream 38, which mixed stream 38 is introduced into the mixed reforming zone 16. In some embodiments, the system 10 further comprises a heat exchange zone 28. The heat exchange zone 28 is configured to receive the second reformate stream 22, an oxidant 24 and fuel 26 and heat the oxidant 24 and fuel 26 to generate a heated oxidant stream 34 and a heated fuel stream 36. In this process, the second reformate stream 22 is cooled to generate a cooled reformate stream 58 comprising hydrogen. In some embodiments, the heat exchange zone 28 comprises a fuel heat exchanger 30 and an oxidant heat exchanger 32. The fuel heat exchanger 32 is configured to receive fuel 26 and deliver a heated fuel 36. The first portion 12 of the heated fuel 36 is introduced to the mixed reforming zone 16 and the second portion 14 of the heated fuel 36 is introduced into the steam reforming zone 18. In some other embodiments, the heated fuel 36 is compressed in a compressor 68 before being introduced to the mixed reforming zone 16 and the steam reforming zone 18.

The exemplary system 10 may further comprise a shift reaction zone 54. The cooled second reformate stream 58 from the heat exchange zone 28 is sent to the shift reaction zone 54, wherein in the presence of a shift catalyst the carbon monoxide in the stream 58 is converted to carbon dioxide and hydrogen and generates a third reformate stream 60 rich in hydrogen. Shift catalyst may include a high temperature shift catalyst (HTS) or a low temperature shift catalyst (LTS) or a combination of HTS and LTS catalysts. The third reformate gas stream 60 rich in hydrogen is further treated in a purification system 62 to generate a hydrogen rich product stream 64 and an off-gas 66. In one embodiment, the off-gas 66, comprising unconverted fuel, carbon monoxide, hydrogen and carbon dioxide, is sent to a steam generator 40, which steam generator 40 utilizes the heat content of the off-gas stream 66 in generating steam 44 from water 42. The cooled off-gas 70 is either vented to the atmosphere after proper treatment or burned to generate heat for any other process requirement. In some embodiments, the steam-reforming zone 18 comprises a combustor (not shown in FIG. 1), which combustor burns the off-gas 66 from the hydrogen purification unit 62 with an oxidant to supply the heat for the reforming reaction in the steam-reforming zone 18. It should be noted that any other fuel might also be used in the combustor to supply the heat for the reforming reaction in the steam-reforming zone 18.

In operation, the exemplary system 10 for hydrogen production as illustrated in FIG. 1 uses the concept of utilizing the heat generated from the catalytic partial oxidation to enhance the steam reforming reaction which is endothermic and needs external heat input. The catalyst used in the mixed reforming zone herein is configured to handle a very high gas hourly space velocity (GHSV), for example in the range of about 72,000 hr$^{-1}$ to about 7,200,000 hr$^{-1}$. In one embodiment, the GHSV in the CPO catalyst is in the range of about 250,000 hr$^{-1}$ to about 3,000,000 hr$^{-1}$.

The primary reactions that occur over the CPO catalyst are indicated in reactions 1-3 below:

$$CH_4 + 1/2 O_2 = CO + 2H_2; \quad (1)$$

$$CH_4 + 3/2 O_2 = CO + 2H_2O. \quad (2)$$

$$CH_4 + 2O_2 = CO_2 + 2H_2O \quad (3)$$

This combination and optimum integration of catalysts in the mixed reforming zone, steam reforming zone and the shift zone decreases the size and cost of the reformer significantly.

Returning back to FIG. 1, the heated oxidant 34 is mixed with the first fuel 12 and steam 48 and the mixed stream 38 is processed over the CPO catalyst in the mixed reforming zone 16. The CPO reaction takes place until the oxygen content in the mixed steam 38 is substantially depleted and the temperature is raised through the exothermic CPO reactions (1-3). Subsequently the steam reforming reaction starts within the mixed reforming zone 16 utilizing the heat generated by the exothermic CPO reactions. The mixed reforming zone 16 is configured to operate at about 700° C. to about 1400° C. to achieve high fuel conversion and to maximize H$_2$ yield.

Conventional steam reforming process is energy intensive and significant heat is needed in the overall reforming process. The main constituent of natural gas is methane (CH$_4$) that reacts with steam in a two-step reaction to produce hydrogen. In accordance with the present technique as shown in FIG. 1, natural gas is converted to hydrogen following the reactions (4) and (5) as mentioned below.

$$CH_4 + H_2O \Leftrightarrow CO + 3H_2 \quad (4)$$

$$CO + H_2O \Leftrightarrow CO_2 + H_2 \quad (5)$$

At least a portion of the incoming second portion of fuel 14 is converted to generate hydrogen by the steam reforming process in the steam-reforming zone 18. The first reaction (4) as described above typically takes place in the steam-reforming zone 18, wherein the fuel such as methane reacts with steam to produce carbon monoxide and hydrogen. In one embodiment, the second reformate gas stream 22 generated from the steam reforming zone 18 comprises carbon monoxide (CO), carbon dioxide (CO$_2$), hydrogen (H$_2$), unutilized fuel and water. The second reaction (5) is the shift reaction, wherein carbon monoxide is converted to carbon dioxide and this reaction mainly takes place in the low temperature shift reaction zone 54.

The steam reforming zone 18 comprises the steam reforming (SR) catalyst that reforms the second fuel 14 and steam at a temperature of about 200° C. to about 1200° C. depending upon the type of fuel used in the steam reforming zone 18. When natural gas is used as the second fuel 14, in one embodiment, the temperature of the steam-reforming zone 18 is at about 550° C. to about 1200° C., and in another embodiment, the temperature of the steam-reforming zone 18 is at about 700° C. to about 900° C. When ethanol is used as the second fuel 14, in one embodiment, the temperature of the steam-reforming zone 18 is at about 350° C. to about 850° C., and in another embodiment, the temperature of the steam-reforming zone 18 is at about 400° C. to about 600° C. When methanol is used as the second fuel 14, in one embodiment, the temperature of the steam-reforming zone 18 is at about 200° C. to about 900° C. Since the steam reforming reaction starts in the mixed reforming zone 16, the volume of the steam-reforming zone 18 can be reduced significantly as compared to conventional steam reforming reactors. Operationally, the steam reforming zone 18 may act as a heat exchanger, wherein the hot side of the reforming zone includes a combustor (not shown in FIGS. 1-2), which combustor is used to combust an oxidant and a fuel (off-gas from the hydrogen purification system).

The fuel used in the systems for hydrogen production disclosed herein may comprise any suitable gas or liquid, such as for example, natural gas, a stream comprising carbon monoxide or hydrogen, naphtha, butane, propane, diesel, kerosene, ethanol, methanol, aviation fuel, a coal derived fuel, a bio-fuel, an oxygenated hydrocarbon feedstock, and mixtures thereof. In some embodiments, the fuel may preferably comprise natural gas (NG). It should be noted that the first fuel 12 and the second fuel 14, each might be chosen from any of these examples of fuels described herein. In one embodiment the first fuel 12 and the second fuel 14 are the same. The oxidant used in the disclosed systems may comprise any suitable gas containing oxygen, such as for example, air, oxygen rich air, oxygen depleted air, or pure oxygen.

Figure 2:
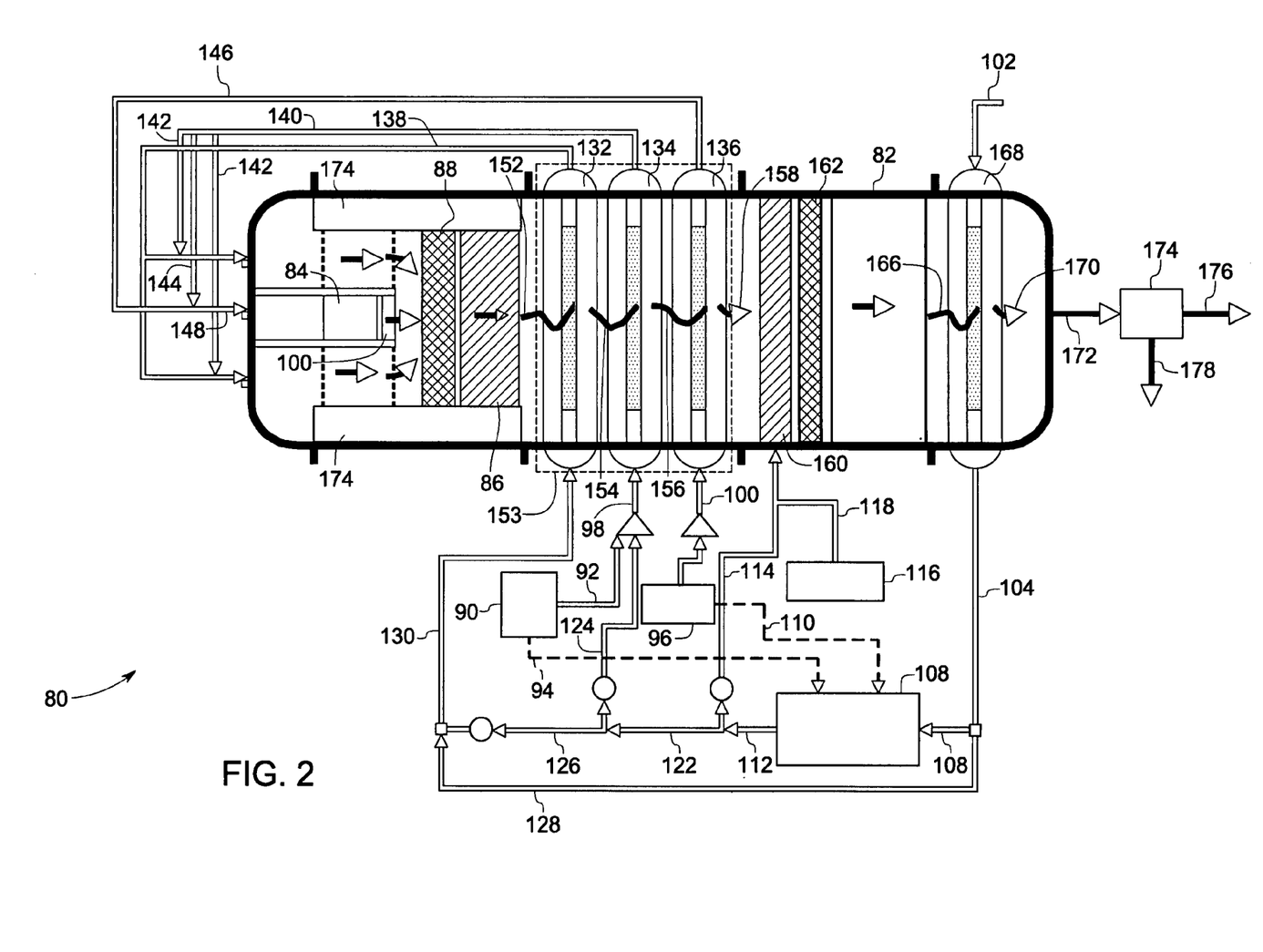
FIG. 2 illustrates an exemplary compact system for hydrogen production.

FIG. 2 represents an exemplary compact system 80 for hydrogen production, wherein all the catalyst zones described previously are configured to be disposed within a single vessel 82. As illustrated in FIG. 2, the system 80 comprises a mixed reforming zone 84 and a steam reforming zone 86. The mixed reforming zone 84 is configured to receive a first fuel 144 and an oxidant 146 to produce a first reformate stream 150. The steam reforming zone 86 is configured to receive the first reformate stream 150, a first portion of steam 130 and a second fuel 142 to produce a second reformate stream 152 comprising hydrogen. In one embodiment, the first portion of fuel 144 and the steam 146 are mixed to form a mixed stream 148, which mixed stream 148 is introduced into the mixed reforming zone 84. As described in the preceding sections, the mixed reforming zone 84 facilitates both catalytic partial oxidation and steam reforming processes. The first reformate stream 152 generated from the mixed reforming zone 84 comprises a gas comprising carbon monoxide, carbon dioxide, unconverted fuel, hydrogen and water. The first reformate stream 150 is mixed with a second portion of fuel and steam 142 in a static mixer 88 and is fed into the steam reforming zone 86. The second reformate stream 152 comprising hydrogen is introduced to a heat exchange zone 153 as described in the preceding section. The cooled reformate stream 158 from the heat exchange zone 153 is sent to a shift zone 164, wherein in the presence of a shift catalyst the carbon monoxide in the stream 158 is converted to carbon dioxide and hydrogen and generates a third reformate stream 166 rich in hydrogen. Shift catalyst may include a high temperature shift catalyst (HTS) or a low temperature shift catalyst (LTS) or a combination of HTS and LTS catalysts. It should be noted that the configurations for heating the oxidant 100 and the first and the second fuels as illustrated in FIGS. 1-2 are non-limiting and heating of the oxidant 100 or the first and the second fuel may be achieved by utilizing heat available at any section of the hydrogen production systems described herein.

In operation, the compact system 80 for hydrogen production as illustrated in FIG. 2 utilizes the concept of utilizing the heat generated from the catalytic partial oxidation to enhance the steam reforming reaction, which is endothermic.

Returning back to FIG. 2, the heated oxidant 146 is mixed with the first fuel 144 and steam and the mixed stream 148 is processed over the CPO catalyst in the mixed reforming zone 84. The CPO reaction takes place until the oxygen content in the mixed steam 148 is substantially depleted and the temperature is raised through the exothermic CPO reactions (1-3). Subsequently the steam reforming reaction starts within the mixed reforming zone 84 utilizing the heat generated by the exothermic CPO reactions. The mixed reforming zone 84 is configured to operate at about 700° C. to about 1200° C. to achieve high fuel conversion and to maximize $H_2$ yield.

At least a portion of the incoming second portion of fuel 142 and mixed stream 148 is converted to generate hydrogen by the steam reforming process in the steam reforming zone 86. The first reaction (4) as described above typically takes place in the steam reforming zone 86, wherein the fuel such as methane reacts with steam to produce carbon monoxide and hydrogen. In one embodiment, the second reformate gas stream 152 generated from the steam reforming zone 86 comprises carbon monoxide (CO), carbon dioxide ($CO_2$), hydrogen ($H_2$), unutilized fuel and water. The second reaction (5) is the shift reaction, wherein carbon monoxide is converted to carbon dioxide and this reaction mainly takes place in the low temperature shift reaction zone 164.

The second reformate gas stream 152 comprising hydrogen rich syngas generated by the steam-reforming zone 86 is cooled in the heat exchange zone 153 before being introduced to a shift catalyst in the shift zone 164. The shift zone 164 is configured to facilitate the shift reaction (5) to reduce the CO concentration and generate more hydrogen to produce a third reformate stream 166 with more rich in hydrogen. The GHSV in the shift catalyst in the shift zone 164 is maintained in the range of about 720 $hr^{-1}$ to about 360,000 $hr^{-1}$. In one embodiment, the GHSV in the shift catalyst is in the range of about 10,000 $hr^{-1}$ to about 150,000 $hr^{-1}$.

The third reformate stream 166 rich in hydrogen is further treated in a purification system 174 to generate a hydrogen product stream 176 and an off-gas 178. As indicated earlier, the off-gas 178 comprising unconverted fuel, carbon monoxide, and carbon dioxide may be combusted with air or $O_2$ to supply the heat for the endothermic reforming reaction (4) in the steam-reforming zone 86 (not shown in FIGS. 1-2). Alternatively the off-gas may be combusted in the boiler of the steam generator 108 to generate steam. The purification process may apply various techniques known in the art, including but not limited to pressure swing adsorption, chemical absorption and membrane separation to generate the hydrogen product gas stream 176.

The methods to separate hydrogen from other gases to produce the hydrogen rich product stream 176 include pressure swing adsorption (PSA) and membrane separation. Pressure swing adsorption (PSA) may be used for separation of hydrogen from a mixture of gases containing hydrogen. In PSA techniques, at a high partial pressure, solid molecular sieves can adsorb gases such as carbon dioxide more strongly than hydrogen. As a result, at elevated pressures, gases other than hydrogen are removed selectively from the mixture of gases comprising hydrogen when this mixture is passed through an adsorption bed. Regeneration of the bed is accomplished by depressurization and purging. Typically for critical operations, a plurality of adsorption vessels are used for continuous separation of hydrogen, wherein one adsorption bed is used while the others are regenerated.

In one embodiment, a membrane separation unit may be used in the purification system. A variety of polymers may be used for hydrogen selective membranes, which membranes operate at relatively low temperatures. In one embodiment, the separation efficiency of the hydrogen can be enhanced by combining a PSA unit with $CO_2$ separation membranes. In the first step $H_2$ is separated by a PSA technique. In the next step, $CO_2$ is separated by $CO_2$ selective membranes. Some polymeric membranes show good permeability and selectivity for $CO_2$ separation at relatively low temperature.

In another embodiment, for $H_2$ rich gas without $N_2$ such as those produced by a SMR, the hydrogen separator may use a cryogenic separation technique. In one embodiment, the third reformate gas stream 49 from the shift reactor is compressed to approximately 900 psia and then cooled to room temperature using a condenser, which condenser liquefies the $CO_2$. Hydrogen can be recovered as a gas from this process, while the $CO_2$ is removed as liquid from the bottom of the condenser.

Another technique for purification of the third reformate gas steam 49 includes separation of carbon dioxide from the third reformate gas stream 49 by chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which generates CaO and $CO_2$.

Yet another technique used for separation of $CO_2$ from the third reformate gas stream 166 may include, but is not limited to, chemical absorption of $CO_2$ using amines. The third reformate gas stream 49 is cooled to a suitable temperature to make use of chemical absorption of carbon dioxide using amines. This technique is based on alkanol amine solvents that have the ability to absorb carbon dioxide at relatively low temperatures, and are easily regenerated by raising the temperature of the rich solvents. The solvents used in this technique may include, for example, triethanolamine, monoethanolamine, diethanolamine, diisopropanolamine, diglycolamine, and methyldiethanolamine.

Returning to FIG. 2, the system 80 may further comprise a fourth heat exchanger 168. Water 102 is introduced to the fourth heat exchanger 168 to extract the heat from the third reformate stream 166 from the shift zone 164. Water is partially vaporized in the fourth heat exchanger 168 to produce a mixture 104 of steam and water. A portion 106 of this mixture 104 is fed into a steam generator 108. A portion of fuel 94 and a portion of air 110 are introduced to the steam generator 108 wherein the fuel 94 is combusted in the boiler to generate steam for the reforming process. A first portion 130 of this steam is introduced to the steam reforming zone 86 and a second portion 124 of this steam is mixed with the fuel 92. A first portion 144 of the mixed stream 98 of the fuel and the steam is fed into the mixed reforming zone 84 and a second portion 142 of the mixed stream 98 of the steam and the fuel is fed into the steam reforming zone 86 as described in the preceding sections.

The heat exchange zone 153 of the system 80 comprises at least one heat exchanger. A first heat exchanger 132 is configured to receive the first portion of steam 130, and the second reformate stream 152 wherein heat is transferred from the second reformate stream 152 to the first portion of steam 130 to generate a heated steam 138 and a first cooled second reformate stream 154. The heat exchange zone further comprises a second and a third heat exchanger. The second heat exchanger 134 is configured to receive the mixed stream 98 and the first cooled reformate stream 154 wherein heat is transferred from the first cooled reformate stream to the mixed stream 98 to generate a heated mixed stream 140 and a second cooled second reformate. The heated mixed stream 140 is subsequently split into a first fuel 144 and a second fuel 142. The third heat exchanger 136 is configured to receive the oxidant 100 and the second cooled second reformate stream 156 wherein heat is transferred from the second cooled second reformate stream 156 to the oxidant 100 to generate a heated oxidant 146 and a third cooled second reformate stream 158.

The third cooled second reformate stream 158 is mixed with a portion of steam 114 from the steam generator 108 and water 118 and the mixing is done in a static mixer 162 prior to being introduced to the shift zone 164. The water 118 is mixed with steam 114 and the mixed stream 120 is used to further cool down the third cooled second reformate stream 158 to facilitate the shift reaction. In some embodiments, the mixed stream 120 is introduced to the static mixer 162 through a distributor 160. It should be noted that that the heat exchangers described herein may be modified to operate at different temperatures. For example, a portion of the first heat exchanger 132 and the second heat exchanger 134 may be combined into one single heat exchanger. Similarly, a portion of the first heat exchanger 132 may be combined with the second heat exchanger 134 and the third heat exchanger 136. In another embodiment, all three exchangers 132, 134 and 136 may be combined into one heat exchanger which exchanger is configured to have the required number of inlets and outlets for heating the fuel, steam and oxidants accordingly.

It should be noted that, typically the overall steam to carbon ratio of a CPO zone is less than about 2.0. The steam to carbon ratio of a conventional steam reforming or ATR process uses a steam to carbon ratio of about 3.0.

In FIGS. 1-2, the purification system 62 or 174 produces the hydrogen rich product gas that may be used in applications requiring pure hydrogen. However the third reformate gas stream 166 from the shift zone 164 also comprises substantial amount of hydrogen and may be used for applications where high purity of hydrogen is not required.

Figure 3:
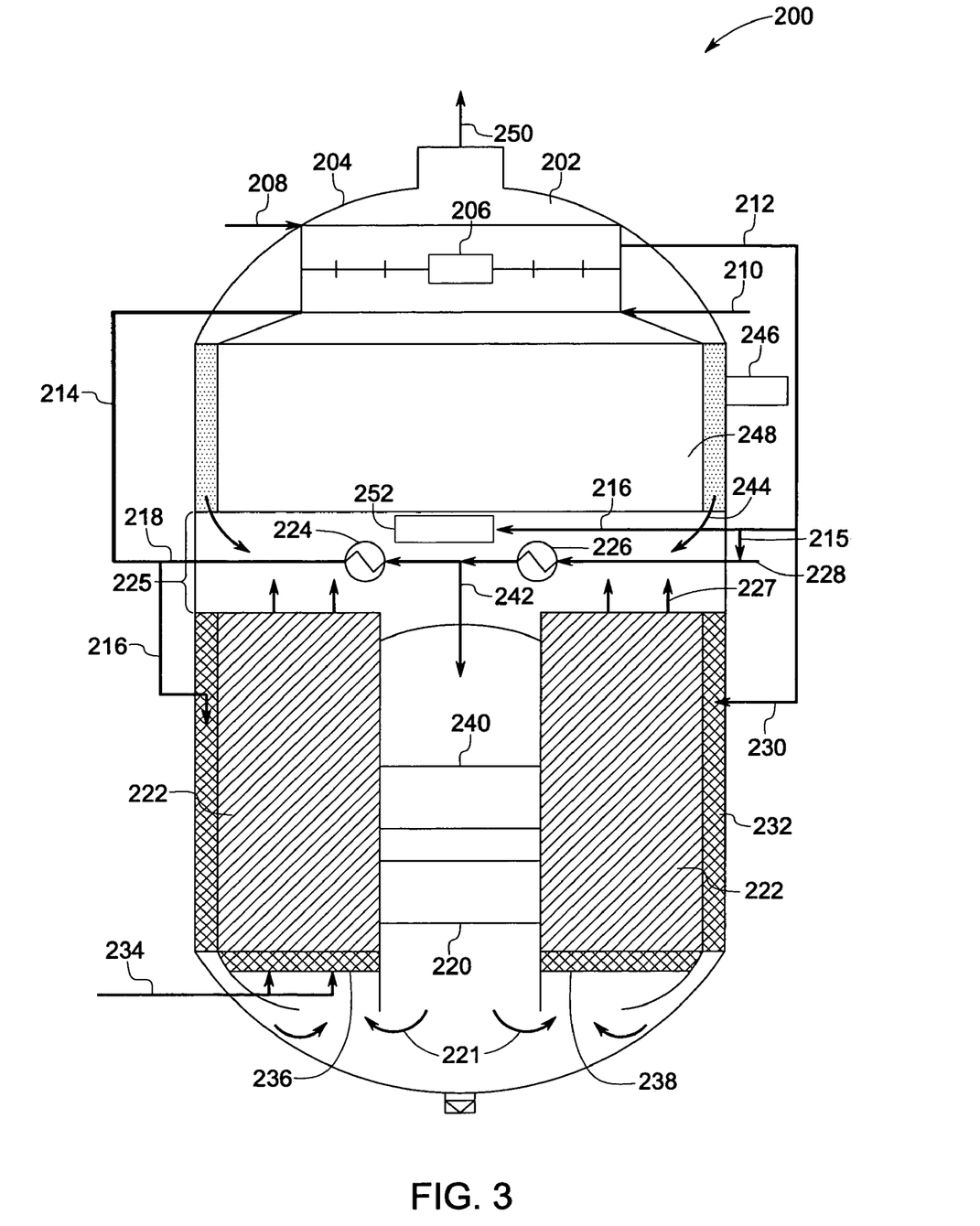
FIG. 3 illustrates another exemplary compact system for hydrogen production with counter current flow in the reactor.
Figure 4:
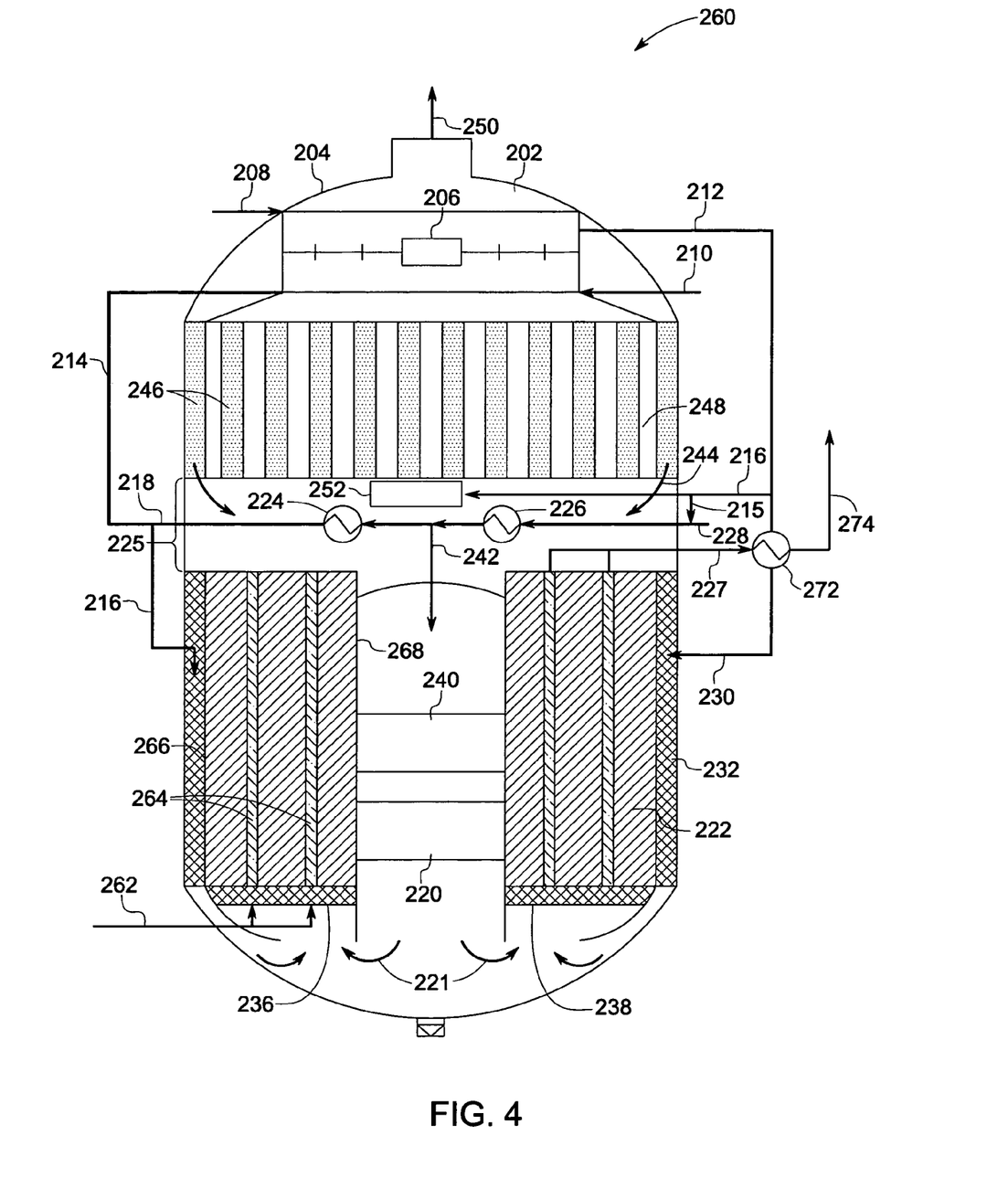
FIG. 4 illustrates yet another exemplary compact system for hydrogen production with counter-current flow in the reactor.

FIGS. 3-4 illustrate exemplary compact systems for hydrogen production in a single reactor 202. As shown in FIG. 3, the system 200 for hydrogen production comprises a single reactor 202. The reactor 202 comprises a steam reforming zone 222, a mixed reforming zone 220, a heat exchange zone 225 and a shift zone 248. The compact single reactor 202 comprises the following catalysts: a steam reforming catalyst placed in the steam reforming zone 222, a CPO catalyst in the mixed reforming zone 220; and a shift catalyst in the shift zone 248. Integrating all these catalysts into a reactor 202 (as shown in FIGS. 3-4) minimizes the capital cost and reduces the system footprint. The exemplary embodiments as illustrated in FIGS. 3-4 allow integration and simplification of the reformer beyond that of the conventional systems where separate reactor units are used for each reaction.

Returning to FIG. 3, a fuel 214 is split into two streams. A first fuel 218 is mixed with steam 215 and an oxidant 228 to form a mixed stream 242, which mixed stream 242 is introduced to the mixed reforming zone 220. For the purpose of understanding, the oxidant is described as air in the embodiments described herein. It should be understood that any other oxidant as listed in the preceding sections may also be used. In some embodiments a first mixer 240 is configured to mix the air and the first portion of fuel 218 before feeling into the mixed reforming zone 220. The first reformate stream 221 from the mixed reforming zone 220 is mixed with high temperature steam 234 in a mixer 236 and is introduced to the steam reforming zone 222. The second portion of the fuel 216 is introduced in the annulus 232 between the wall 204 of the compact reformer 202 and the steam reforming zone 222, which annulus 232 functions as the exchanger to supply the heat from the incoming fuel 216 to the steam reforming zone 222. The high temperature steam 234 may be supplied from a boiler where the off-gas from the purification unit is combusted (not shown in FIG. 3). The flow through the catalyst bed in the steam reforming zone 222 is countercurrent to the flow in the mixed reforming zone 220. The second reformate stream 227 from the steam reforming zone 222 facilitates the heating of the incoming first portion of fuel 218 in a heat exchanger 224 and simultaneously facilitates the heating of the incoming air in another heat exchanger 226. As the heat is extracted from the second reformate stream 227 in the heat exchange zone 225, the heating of the incoming fuel 218 and air 228 cools down the second reformate stream 227 and the cooled second reformate stream is mixed with steam 216 prior to entering the shift zone 248. The steam 244 is introduced in the annulus between the shift zone 248 and the wall 204 of the reformer 202. Since shift reaction is an exothermic reaction the heat generated in the shift zone 248 is utilized to raise the steam temperature for the shift reaction. The third reformate stream from the shift zone 248 is utilized to heat the water 208 to generate steam 212 and simultaneously heat the incoming fuel 210 in an exchanger 206. The cooled third reformate stream 250 is sent to the purification unit (not shown in FIG. 3) for generating substantially pure hydrogen gas.

FIG. 4 illustrates yet another exemplary compact systems 260 for hydrogen production in a single reactor 202. The system illustrated in FIG. 4 comprises several tubes 262 disposed within the steam reforming zone 266. An oxidant such as air and the off-gas from the purification unit (not shown in FIG. 4) is introduced to these plurality of tubes 262, wherein the mixture is combusted to produce the heat for the endothermic steam reforming reaction in the steam reforming zone 266. Any other fuel may also be used along with air to produce the heat for the steam reforming reaction. The exhaust 270 from these plurality of tubes 264 is fed to an exchanger 272 wherein the heat is extracted to heat the incoming steam 212 to produce heated steam 230 for the steam reforming reaction. A cooled exhaust 274 may be vented to atmosphere after proper treatment.

Figure 5:
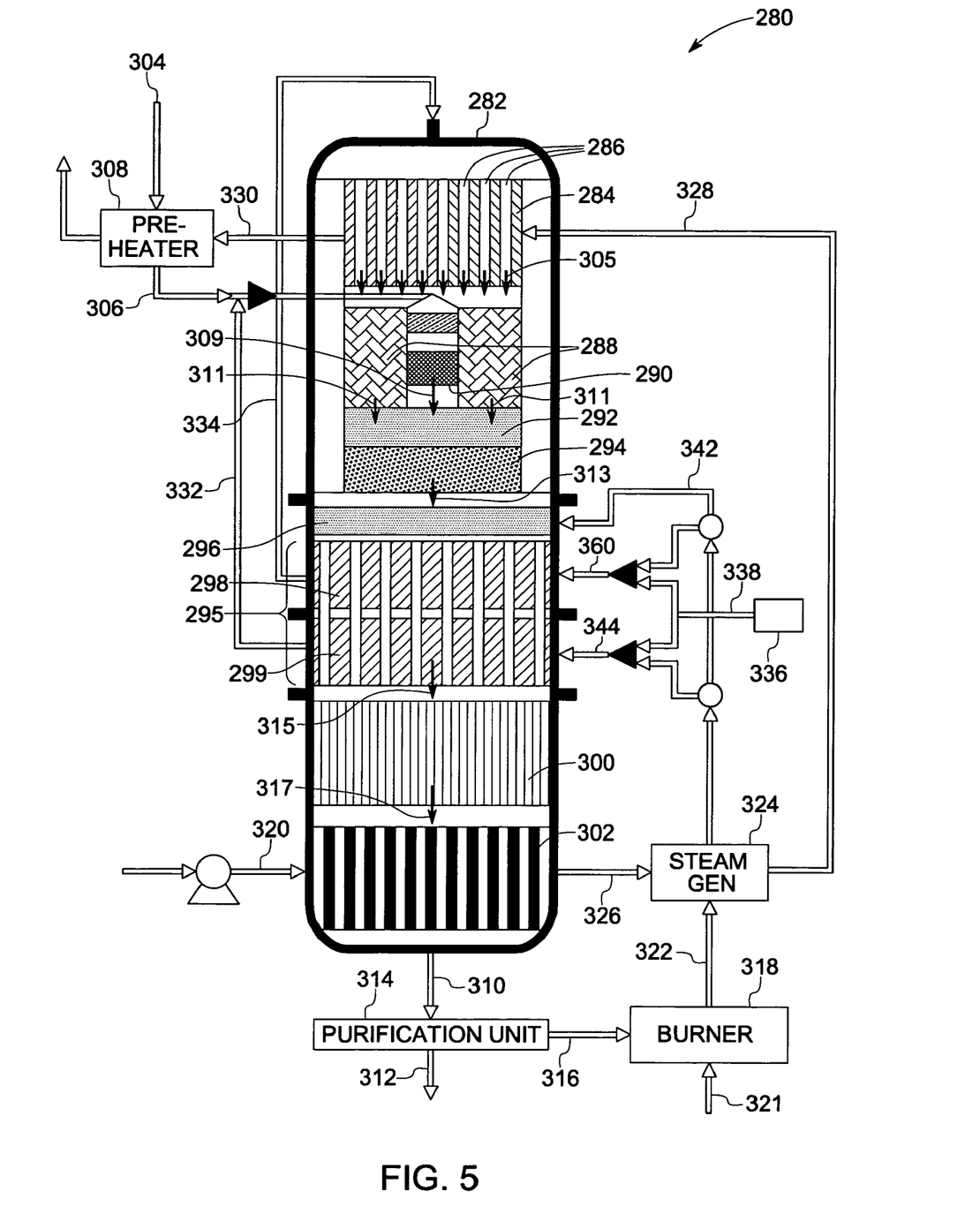
FIG. 5 illustrates another exemplary compact system for hydrogen production with a pre-reformer.

FIG. 5 illustrates another compact reformer 280 for producing hydrogen, wherein all the catalyst zones described previously are configured to be disposed within a single vessel 282. As illustrated in FIG. 5, the system 280 comprises a mixed reforming zone 290 and a first steam-reforming zone 288 and a second steam-reforming zone 294. The mixed reforming zone 290 is configured to receive a first fuel 307 and an oxidant 306 to produce a first reformate stream 309. The exemplary compact reformer 280 further comprises a pre-reformer 284 to pre-reform a second portion of fuel 334 prior to introducing into the first steam-reforming zone 288. The second portion of fuel 334 is mixture of a part of the fuel 338 and steam 350. Similarly the first fuel 307 is a mixture of a part of the fuel 338, steam 348 and air 306. The pre-reformer 284 partially reforms the second portion of the fuel 334 to generate a pre-reformed stream 305. The pre-reformer 284 operates at a temperature of less than about 800° C. The first steam reforming zone 288 is configured to receive the pre-reformed stream 305 from the pre-reformer 284 and generate an exit reformate stream 311 from the first steam reforming zone. The mixed reforming zone 290 is configured to receive the first portion of fuel 307 and generate the first reformate stream 309 comprising hydrogen. As described in the preceding sections, the mixed reforming zone 290 facilitates both catalytic partial oxidation and steam reforming processes. In operation, the compact system 280 for hydrogen production as illustrated in FIG. 5 utilizes the concept of utilizing the heat generated from the catalytic partial oxidation or auto thermal reforming (ATR) in the mixed reforming zone 290 to enhance the steam reforming reaction which is endothermic. The first reformate stream 309 generated from the mixed reforming zone 290 comprises a gas comprising carbon monoxide, carbon dioxide, unconverted fuel, hydrogen and water. The first reformate stream 309 is mixed with the exit reformate stream 311 from the first steam reforming zone 288 and introduced into a mixer 292 prior to being introduced to a second steam reforming zone 294. The second steam reforming zone 292 is configured to complete the steam reforming reaction and generate a second reformate stream 313.

Returning to FIG. 5, the second reforming stream 313 comprising hydrogen is introduced into a steam distributor 296 configured to reduce the temperature of the second reformate stream 3131 using steam 342. After passing through the steam distributor 296, the second reformate stream 313 is introduced into a heat exchange zone 295 as described in the preceding section. The heat exchange zone 295 comprises a first heat exchanger 298 and a second heat exchanger 299. The first heat exchanger 298 is configured to utilize the heat content of the second reformate stream 313 to heat the incoming second portion of fuel 360 and generated a heated second portion of fuel 334. The second heat exchanger 299 is configured to heat the incoming first portion of fuel 342 and generate a heated first portion of fuel 332 and a cooled reformate stream 315. The cooled reformate stream 315 from the heat exchange zone 295 is sent to a shift zone 300, wherein in the presence of a shift catalyst the carbon monoxide in the cooled reformate stream 315 is converted to carbon dioxide and hydrogen and generates a third reformate stream 317 rich in hydrogen. Shift catalyst may include a high temperature shift catalyst (HTS) or a low temperature shift catalyst (LTS) or a combination of HTS and LTS catalysts. The third reformate stream 317 is sent to a third heat exchanger 302. Water 320 is introduced into the third heat exchanger 302 to extract the heat from the third reformate stream 317 to generate a cooled third reformate 310 and steam 326. The cooled third reformate stream 310 is sent to a purification unit 314 for generating substantially pure hydrogen gas 312. The off gas stream 316 generated from the purification unit is burned in a burner 318 using air 321 to generate a hot gas 322. In one embodiment, the off gas is burned in presence of a catalyst in a catalytic burner. The hot gas 322 is utilized in a steam generator 324 to generate steam 346 and a partially cooled hot gas 328. The temperature of this stream 328 is at about 750~800° C. In operation, the heat content of this stream 328 is utilized to initiate the steam reforming reaction in the pre-reformer 284, which pre-reformer 284 in one embodiment may be a shell and tube heat exchanger with the stream 328 flowing in the hot side of the tubes 286. The exit hot gas 330 from the pre-reformer 284 is used to pre-heat the oxidant (air) 304 in a pre-heater 308. The pre-heater 308 is configured to generate a heated oxidant 306, which heated oxidant 306 is mixed with the heated fuel and steam 332 before being introduced to the mixed reforming zone 290.

The systems for production of hydrogen described herein have many advantages. In the disclosed compact systems for hydrogen production the capital and O&M costs are significantly lowered when the size of the reactor is reduced by the overall efficiency of the heat-integrated processes described herein is high and facilitates in reduction of fuel and consumables. The efficiency of the overall process also increases by utilizing the off-gas from the purification system to generate heat for the pre-reforming, steam generation and preheating of the fuel. Therefore, the disclosed systems recover the excess heat from the off-gas efficiently that allows the efficiency of overall process to be improved significantly over conventional hydrogen production processes. This system design provides the possibility of optimizing the catalyst for each individual reaction such as CPO or SMR, and uses the catalyst best suitable for each reaction. The amount of steam introduced into the two zones can also be optimized for the best yield.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A system comprising:
    a mixed reforming zone configured to receive a first fuel steam mixture and an oxidant to produce a first reformate stream comprising hydrogen; and
    at least one steam reforming zone configured to receive said first reformate stream, a first portion of steam and a second fuel to produce a second reformate stream comprising hydrogen;
    a heat exchange zone and a shift reaction zone;
    said heat exchange zone comprises a first heat exchanger configured to receive said first portion of steam and said second reformate stream wherein heat is transferred from said second reformate stream to said first portion of steam to generate a heated steam and a cooled reformate stream;
    wherein said first reformate stream is mixed with said first portion of steam and second fuel before entering said at least one steam reforming zone.

2. The system of claim 1, wherein said mixed reforming zone comprises a catalytic partial oxidation (CPO) or an auto-thermal reforming (ATR) zone.

3. The system of claim 1, wherein said heat exchange zone comprises a second heat exchanger configured to receive said first fuel and said second fuel and said first cooled second reformate stream wherein heat is transferred from said first cooled second reformate stream to said first and second fuel to generate heated first and second fuel and a second cooled second reformate stream.

4. The system of claim 3, wherein said heat exchange zone comprises a third heat exchanger configured to receive said oxidant and said second cooled second reformate gas stream wherein heat is transferred from said second cooled second reformate gas stream to said oxidant to generate a heated oxidant and a third cooled second reformate stream.

5. The system of claim 4, wherein said shift reaction zone is configured to receive said third cooled second reformate stream and steam to generate a third reformate stream rich in hydrogen.

6. The system of claim 5 further comprising a purification system, wherein said purification system generates an off-gas and a hydrogen rich product gas.

7. The system of claim 6, wherein said off-gas is recycled to a steam generator to generate steam and produce a cooled off-gas.

8. The system of claim 6 further comprising a fourth heat exchanger configured to receive said third reformate stream and water, wherein heat is extracted from said third reformate stream to produce steam and a cooled third reformate gas stream.

9. The system of claim 1, wherein said first fuel and second fuel is selected from the group consisting of natural gas, methane, methanol, ethanol, a stream comprising naphtha, butane, propane, diesel, kerosene, an aviation fuel, a coal derived fuel, a bio-fuel, an oxygenated hydrocarbon feedstock, and mixtures thereof.

10. The system in claim 1, wherein said first fuel and said second fuel comprises natural gas.

11. The system of claim 1, wherein said steam reforming zone is configured to operate at about 500° C. to about 1200° C.

12. The system of claim 1, wherein said at least one steam reforming zone is configured to operate at about 350° C. to about 850° C. and said second fuel is ethanol.

13. The system of claim 1, wherein said at least one steam reforming zone is configured to operate at about 200° C. to about 400° C. and said second fuel comprises methanol.

14. The system of claim 1, wherein said steam reforming zone, said catalytic partial oxidation zone, said heat exchange zone and said shift reaction zone are configured to be placed in a vessel.

15. The system of claim 6, wherein said purification system comprises an unit selected from the group consisting of at least one chemical absorber, pressure swing adsorber, cryogenic separator, membrane separator and liquefier.

16. The system of claim 1, wherein said oxidant is selected from a group consisting of air, oxygen rich air, oxygen depleted air, and pure oxygen.

17. The system of claim 1, wherein said oxidant is air.

18. The system of claim 1 further comprising a pre-reformer to reform said second fuel before said second fuel is introduced into said at least one reforming zone.

19. The system of claim 18 wherein said system further comprising a purification system, said purification system generating an off-gas and a hydrogen rich product gas and said pre-reformer utilizes the heat from said off gas to reform said second fuel.

20. A system comprising:
a mixed reforming zone configured to receive a first fuel with steam and an oxidant to produce a first reformate stream;
a pre-reformer configured to receive a first portion of steam and a second fuel to produce a pre-reformed stream comprising hydrogen;
a first reforming zone configured to receive said pre-reformed steam and generate an exit reformed stream comprising hydrogen; and
a second reforming zone configured to receive said first reformate stream and exit reformate stream to generate a second reformate stream comprising hydrogen;
wherein said first reformate stream is mixed with said exit reformate stream before entering said second steam reforming zone.

21. The system of claim 20, wherein said mixed reforming zone comprises a catalytic partial oxidation (CPO) or an auto-thermal reforming (ATR) zone and said second steam reforming zone is an reactor wherein the heat to drive endothermic steam reforming reaction is provided by said CPO or ATR zone.

* * * * *